(12) United States Patent
Gunnarsson et al.

(10) Patent No.: US 7,269,422 B2
(45) Date of Patent: Sep. 11, 2007

(54) WIRELESS TELECOMMUNICATIONS WITH ADJUSTMENT OF UPLINK POWER LEVEL

(75) Inventors: Fredrik Gunnarsson, Linköping (SE); Thomas Ostman, Spånga (SE); Bo Hagerman, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 54 days.

(21) Appl. No.: 11/176,686

(22) Filed: Jul. 8, 2005

(65) Prior Publication Data

US 2007/0010253 A1   Jan. 11, 2007

(51) Int. Cl.
*H04Q 7/20* (2006.01)
(52) U.S. Cl. .................. 455/442; 455/439; 455/552.1; 370/331; 370/332
(58) Field of Classification Search ................ 455/442, 455/439, 438, 552, 552.1; 370/331, 332, 370/328
See application file for complete search history.

(56) References Cited

U.S. PATENT DOCUMENTS

| | | | |
|---|---|---|---|
| 6,144,861 A | 11/2000 | Sundelin et al. | |
| 6,154,450 A | 11/2000 | Wallentin et al. | |
| 6,445,917 B1 | 9/2002 | Bark et al. | |
| 6,473,624 B1 | 10/2002 | Corbett et al. | |
| 6,487,420 B1 | 11/2002 | Jönsson | |
| 6,493,541 B1 | 12/2002 | Gunnarsson et al. | |
| 6,577,875 B1 | 6/2003 | Brouwer | |
| 6,584,330 B1 | 6/2003 | Ruuska | |
| 6,633,766 B1 | 10/2003 | van der Pol | |
| 6,690,939 B1 | 2/2004 | Jonsson et al. | |
| 6,760,594 B1* | 7/2004 | Murasawa et al. | 455/512 |

(Continued)

FOREIGN PATENT DOCUMENTS

WO   01/95521 A2   12/2001

(Continued)

OTHER PUBLICATIONS

International Search Report and Written Opinion mailed Nov. 28, 2006 in corresponding PCT Application No. PCT/SE2006/050233.

(Continued)

*Primary Examiner*—Danh Le
(74) *Attorney, Agent, or Firm*—Nixon & Vanderhye, P.C.

(57) ABSTRACT

A control node (26) of a radio access network (24) comprises a soft handover unit (62) and a power control unit (50). The soft handover unit (62) controls a soft handover procedure wherein a user equipment unit (30) has diversity in radio transmissions with plural radio base stations (28) comprising an active set of base stations. The power control unit (50), during the soft handover procedure, facilitates an adjustment of an uplink power level used by the user equipment unit (30) for uplink radio transmissions to the plural base stations by an adjustment amount. The adjustment amount is determined to promote uplink synchronization for all radio base stations of the active set. In one example embodiment, the power control unit (50) comprises a soft handover power boost function (70) which, during the soft handover procedure, increases the uplink power level used by the user equipment unit (30) for uplink radio transmissions by the adjustment amount. The adjustment amount is preferably a function of a difference between power levels of downlink reference signals of the active set.

36 Claims, 11 Drawing Sheets

U.S. PATENT DOCUMENTS

| | | | |
|---|---|---|---|
| 6,799,045 B1 | 9/2004 | Brouwer | |
| 6,823,193 B1 | 11/2004 | Persson et al. | |
| 6,836,661 B2 * | 12/2004 | Mohebbi | 455/437 |
| 6,845,238 B1 | 1/2005 | Müller | |
| 6,912,228 B1 | 6/2005 | Dahlman et al. | |
| 7,010,315 B1 * | 3/2006 | Pan et al. | 455/519 |
| 2002/0077113 A1 | 6/2002 | Spaling et al. | |
| 2002/0094833 A1 | 7/2002 | Lieshout et al. | |
| 2002/0115460 A1 | 8/2002 | Rune et al. | |
| 2003/0092463 A1 * | 5/2003 | Charriere et al. | 455/522 |
| 2004/0209264 A1 | 10/2004 | Rune et al. | |
| 2005/0025100 A1 * | 2/2005 | Lee et al. | 370/335 |
| 2005/0030964 A1 * | 2/2005 | Tiedemann et al. | 370/431 |
| 2005/0037797 A1 | 2/2005 | Hamabe | |

FOREIGN PATENT DOCUMENTS

| | | |
|---|---|---|
| WO | 03/077584 A1 | 9/2003 |

OTHER PUBLICATIONS

Hamabe, "Adjustment Loop Transmit Power Control During Soft Handover in CDMA Cellular Systems", Vehicular Technology Conference, 2000, IEEE VTS Fall VTC 2000, $52^{nd}$ Sep. 24-28, 2000, Piscataway, NJ, IEEE, publ. Sep. 24, 2000, vol. 4, pp. 1519-1523.

* cited by examiner

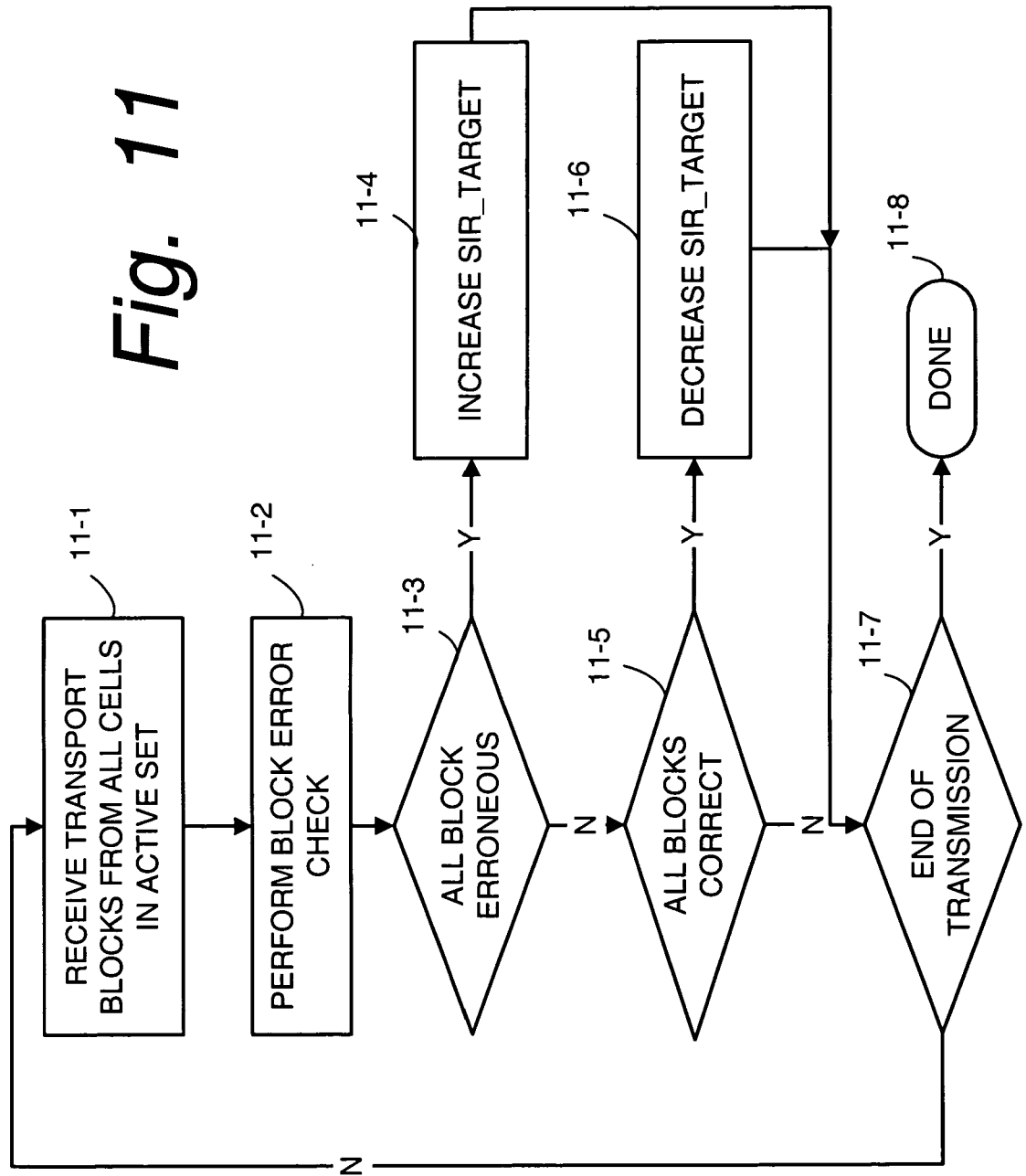

WIRELESS TELECOMMUNICATIONS WITH ADJUSTMENT OF UPLINK POWER LEVEL

BACKGROUND

I. Technical Field

The present invention relates to cellular radio communication networks, and particularly to power control for achieving soft handover.

II. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. Different types of control channels may exist between one of the base stations and user equipment units (UEs), such as (as one example) a common pilot channel (CPICH).

In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover."

Soft handover thus means that the radio links are added and removed in a way that the user equipment unit always keeps at least one radio link to the UTRAN. Soft handover is performed by means of macro diversity, which refers to the condition that several radio links are active at the same time. Normally soft handover can be used when cells operated on the same frequency are changed.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface". In some instances, a connection involves both a Serving or Source RNC (SRNC) and a target or drift RNC (DRNC), with the SRNC controlling the connection but with one or more diversity legs of the connection being handling by the DRNC. The interface between a SRNC and a DRNC is termed the "Iur" interface.

In general, a CDMA base station attempts to maintain the same received power level in communications with each mobile station that it currently serves. To this end, a base station measures the received signal from each of the mobile stations in order to determine a parameter known as the Signal to Interference Ratio (SIR). For each mobile station, the SIR is compared with a target value SIR. If the SIR measured for a particular mobile station is less than the target value SIR, the base station commands the mobile station to increase its power in order that a stronger signal can be received at the base station. On the other hand, if the SIR determined for the particular station is greater than the target value SIR, the base station requests the mobile station to decrease its power. Thus, a power control loop ("inner power control loop") is established between the base station and the mobile station. An uplink aspect of the inner power control loop involves the mobile station transmitting to the base station. Upon receiving the signal from the mobile station, the base station compares the SIR for the station with the target SIR and provides power control commands to the mobile station as a downlink aspect of the power control loop.

The target SIR must be continually updated for numerous reasons, e.g., increase and decrease of the number of mobile stations served by the base station. The updating of the target SIR typically is part of another control loop, in particular a quality control loop or "outer power control loop" between the base station and the radio network controller (RNC). In an uplink aspect of the quality control loop, the base station provides the radio network controller (RNC) with an indication of the quality of connection for each of the mobile stations currently served. The radio network controller (RNC) uses such quality indication in order to calculate or otherwise determine the updated SIR target value. The updated SIR target value is then transmitted to the base station on a downlink aspect of the quality control loop. Examples of uplink power control are provided in U.S. Pat. No. 5,623,484 to Muszynski and U.S. Pat. No. 6,154,450 to Wallentin et al, both of which are incorporated herein by reference.

The UMTS specifications (see, e.g., 3 GPP TS 25.214 version 6.5.0, incorporated herein by reference) discuss criteria and techniques for determining whether or not a connection with a mobile, i.e., user equipment unit (UE), is having reception quality good enough for communication or not. Such determination is typically based on ability to obtain synchronization with the user equipment unit.

Cell breathing and soft handover are two central characteristics and mechanisms in CDMA systems. "Cell breathing" means that the cell coverage is varying with the cell load, and is discussed, e.g., in U.S. patent application Ser. No. 09/385,375, filed Aug. 30, 1999, and entitled "CELL BREATHING REDUCTION FOR TELECOMMUNICATIONS", which is incorporated by reference herein in its entirety.

In UTRAN, a mobile station is requested to report measurements related to base stations in the 'monitored set'—a set of base stations that is updated every time the connected set of base stations is updated. For example, the mobile is connected to cell B, and monitors all cells in the monitored set. When cell A becomes a sufficiently good candidate, the mobile station reports such to the radio network controller (RNC) in a measurement report. The radio network controller (RNC) responds by adding cell A to the active set via the RRC message Active Set Update, which is confirmed by the mobile station. Then the RNC updates the 'monitored set' in the mobile by the RRC message Measurement Control. The scheme is then repeated as necessary.

"Soft handover" implies that users may gradually leave one cell and enter another cell. Users enter and leave soft handover based on relative measurements of common pilot channel (CPICH) quality for the base stations. In an ideal case with simplistic propagation, the received CPICH RSCP (Received Signal Code Power) degrades as $1/r^4$, where "r" is the distance to the base station. The CPICH RSCP is equal halfway between the base stations, and also the uplink RSCP is equal in two base stations when the UE is halfway.

The uplinks and downlinks are said to be balanced if the point where the uplink RSCPs are equal coincides with the point where the CPICH RSCPs are equal. In order to match the cell coverage to the available resources, CPICH powers can be tuned to adapt the relative number of users that are allocated to the base stations. However, this adaptive tuning also means that the balance is lost. In addition to different CPICH power settings, the imbalance between uplink and downlink can also result from or depend on such factors as the feeder losses and the use of tower mounted low-noise amplifiers, for example. Balancing of uplink and downlink power is addressed, albeit differently, in Swedish Patent Application 0402003-8, filed Aug. 6, 2004, which is incorporated herein by reference.

FIG. 1A and FIG. 1B are graphs showing (downlink) CPICH RSCP and uplink (UL) RSCP (in watts power), respectively, for two example base stations (a left base station and a right base station) as functions of distance relative to the two base stations. In both FIG. 1A and FIG. 1B, the "left" base station can be conceptualized as located at the leftmost position of the X axis (e.g., X=0) while the "right" base station can be conceptualized as located at the rightmost position of the X axis (e.g., X=1000). The X axis is labeled in distance units from the left base station. In FIG. 1A the curve 1A-L represents the CPICH RSCP as a function of distance from the left base station, while the curve 1A-R represents the CPICH RSCP as a function of distance from the right base station. With regard to the right base station, the CPICH RSCP (FIG. 1A) increases along the X axis. Similarly, in FIG. 1B the curve 1B-L represents the UL RSCP as a function of distance from the left base station, while the curve 1B-R represents the UL RSCP as a function of distance from the right base station.

In FIG. 1A, a soft handover region has a leftmost end depicted by vertical dashed line $SO_{L-A}$ and a rightmost end depicted by vertical dashed line $SO_{R-A}$. In FIG. 1B, a soft handover region has a leftmost end depicted by vertical dashed line $SO_{L-B}$ and a rightmost end depicted by vertical dashed line $SO_{R-B}$. The farther a mobile station travels (to the left) from the right base station, the lower the CPICH RSCP becomes for the right base station. Eventually, a measurement report is triggered, which cause the left cell of the left base station to be reported and eventually added to the active set. As the mobile station travels even further to the left, the right cell is dropped from the active set, so that only the left cell remains, which gradually experiences an improving CPICH RSCP.

In the situation shown in FIG. 1A and FIG. 1B, the left cell or left base station has a 3 dB higher CPICH power than the right cell, which means that this left cell will attract more users than the right cell. This also creates an imbalance in the network. This imbalance is exemplified in FIG. 1B wherein uplink RSCP to the left cell is weak at a rightmost end of the soft handover region (e.g., at vertical dashed line $SO_{R-B}$).

The imbalance illustrated by FIG. 1A and FIG. 1B is critical when moving from right to left, since the leftmost cell will have difficulties to synchronize to the mobile station at these low levels—especially if the CPICH power difference is large. This could for example be the case in a macro-micro deployment.

The uplink RSCP differences are emphasized in FIG. 2A and FIG. 2B, which are similarly constructed and labeled as FIG. 1A and FIG. 1B for a left base station and a right base station. FIG. 2A and FIG. 2B depict RSCP values when moving from one cell to another (moving and soft handover from left to right in FIG. 2A; moving and soft handover from right to left in FIG. 2B). When the mobile station is essentially exactly between the two base stations at X=500, both base stations receive from the mobile station at the same level. The path losses from both base stations are also equal at this location. However, CPICH RSCP is different, since there is a difference in CPICH power (3 dB). This means that based on downlink measurements, the mobile station measures equal CPICH RSCP from both base stations at x=550, i.e. the left cell is experienced as the larger of the two cells.

SUMMARY

A control node of a radio access network comprises a soft handover unit and a power control unit. The soft handover unit controls a soft handover procedure wherein a user equipment unit has diversity in radio transmissions with plural radio base stations comprising an active set of base stations. The power control unit, during the soft handover procedure, facilitates an adjustment of an uplink power level used by the user equipment unit for uplink radio transmissions to the plural base stations by an adjustment amount. The adjustment amount is determined to promote uplink synchronization for all radio base stations of the active set.

In one example embodiment, the power control unit comprises a soft handover power boost function which, during the soft handover procedure, increases the uplink power level used by the user equipment unit for uplink radio transmissions by the adjustment amount. The soft handover power boost function is invoked only during the soft handover procedure. The adjustment amount is preferably a function of power levels of downlink reference signals of the active set, such as a function of a difference between power levels of downlink reference signals of the active set. For example, the adjustment amount is a function of a difference between the power level of a strongest reference signal of the active set and the power level of a weakest reference signal of the active set. The downlink reference signals are signals which are measured and reported by the user equipment unit to the soft handover unit for use in determining when a soft handover procedure is to be invoked. For example, the downlink reference signals may be CPICH signals, and the power levels thereof may be the CPICH received signal code power (RSCP).

As an optional aspect, the adjustment amount can also take into consideration an additional factor or offset which reflects the priority or urgency of achieving the desired result of obtaining uplink synchronization.

In accordance with one example implementation, one way in which the power control unit facilitates the adjustment of an uplink power level is by at least ultimately controlling a maximum uplink power level used by the user equipment unit for uplink radio transmissions to the plural base stations. For example, the power control unit can control the maximum uplink power level by modifying a target signal to interference ratio (SIR) of an outer loop power control scheme.

In one example implementation, the soft handover power boost function is initiated by the soft handover procedure and is terminated at the end of the soft handover procedure. In another example implementation, the soft handover power boost function is terminated in dependence upon receipt of notification of completion of uplink synchronization for a new radio base station added to the active set.

In another separate and distinct aspect of the technology, the power control unit further can optionally further adjust the uplink power level during the soft handover procedure in dependence upon whether all transport blocks received via the active set are erroneously received or whether all transport blocks received via the active set are accurately received.

As another aspect of the technology, the power control unit, during the soft handover procedure, modifies a parameter of an outer loop power control scheme to facilitate an adjustment of an uplink power level used by the user equipment unit for uplink radio transmissions to the plural base stations and thereby promote uplink synchronization for all radio base stations of the active set. For example, the parameter of an outer loop power control scheme so modified can be the target signal to interference ratio (SIR) of the outer loop power control scheme.

Another aspect of the technology concerns a method of operating a control node of a radio access network. In its basic steps, the method comprises initiating a soft handover procedure, and then during the soft handover procedure, facilitating an adjustment of an uplink power level used by the user equipment unit for uplink radio transmissions to the plural base stations by an adjustment amount. As indicated previously, the adjustment amount is determined to promote uplink synchronization for all radio base stations of the active set. One example mode of carrying out the method involves, during the soft handover procedure, increasing the uplink power level used by the user equipment unit for uplink radio transmissions by the adjustment amount, wherein the adjustment amount is a function of power levels of downlink reference signals of the active set. For example, the method can involve setting the adjustment amount as a function of a difference between the power level of a strongest reference signal of the active set and a power level of the weakest reference signal of the active set. Other aspects of the method, including but not limited to initiation and termination of the soft handover power boost function, or comparable operations, are understood from the foregoing description of the control node and its power control unit.

Advantageously, the RNC power control process unit can control a maximum uplink power level by modifying a target signal to interference ratio. Another advantage involves using a soft handover power boost function to facilitate the adjustment of the uplink power level during the soft handover procedure.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 11 is a flowchart showing basic, representative steps or actions performed in conjunction with logic for adjusting uplink power level during the soft handover procedure in dependence upon accuracy of block reception.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 3:
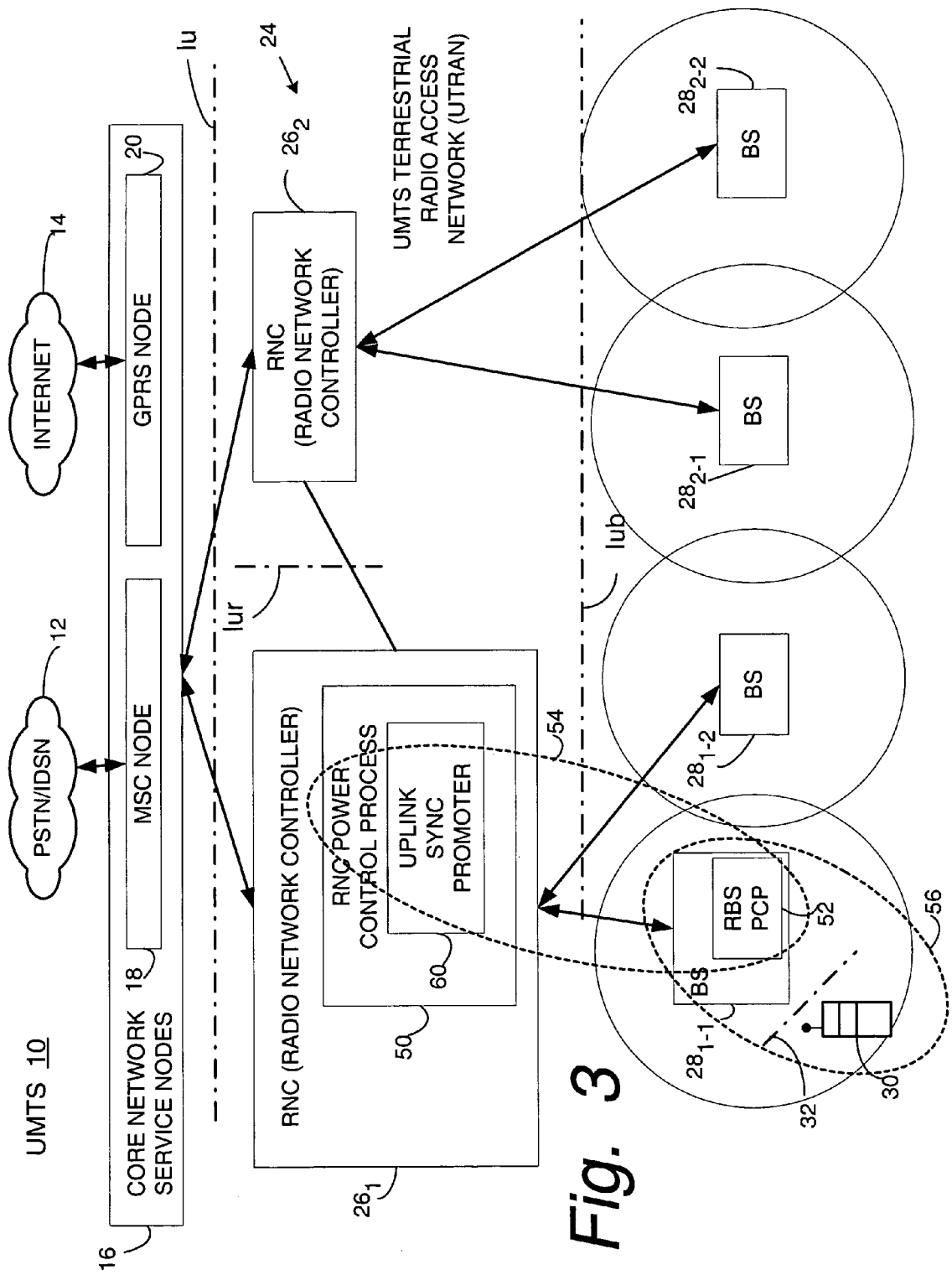
FIG. 3 is a diagrammatic view of an example mobile communications system in which the present technology may be advantageously employed.

The present technology is described in the non-limiting, example context of a universal mobile telecommunications (UMTS) 10 shown in FIG. 3. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $26_1$ and RNC$26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 3 shows that an RNC can be connected over an Iur interface to one or more other RNCs in the URAN 24.

A user equipment unit (UE), such as user equipment unit (UE) 30 shown in FIG. 3, communicates with one or more base stations (BS) 28 over a radio or air interface 32. Each of the radio interface 32, the Iu interface, the Iub interface, and the Iur interface are shown by dash-dotted lines in FIG. 3.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. Traffic channels (TCH) may be allocated to carry substantive call communications with a user equipment unit (UE).

Figure 4:
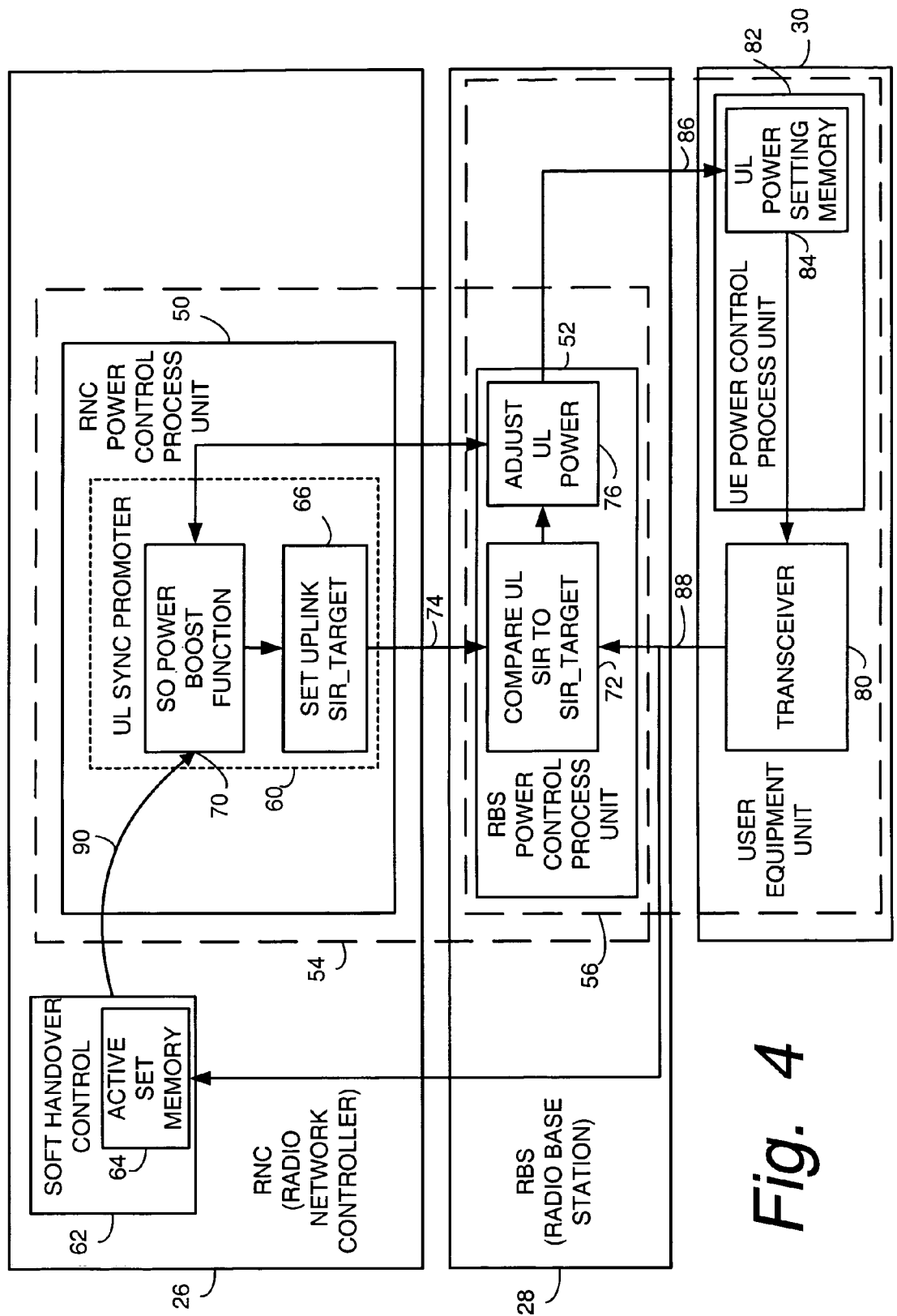
FIG. 4 is a schematic view of selected constituent units of an example radio network controller (RNC), an example radio base station, and an example user equipment unit, according to a first example embodiment.

The radio network control nodes (RNCs) 26 typically each include a RNC power control process function or unit 50, while each of the radio base stations (RBS) typically include a RBS power control process function or unit 52. For sake of simplicity, the RNC power control process unit 50 and the RBS power control process unit 52 are illustrated only in a representative RNC 26 and representative RBS 28, respectively, in FIG. 3. The RNC power control process unit 50 and RBS power control process unit 52 cooperate to execute an outer loop power control for a connection with the UE 30 handled by the RNC 26 and the RBS 28, while the RBS power control process unit 52 interacts with power control functionalities of UE 30 in performance of an inner loop power control for the connection. In FIG. 4, outer loop power control is depicted by broken line 54, while inner loop power control is depicted by broken line 56.

In inner loop power control 56, the user equipment unit 30 transmits to the radio base station 28. The radio base station 28, upon receiving the signal from the user equipment unit 30, compares the SIR for the user equipment unit 30 with the target SIR (established by outer loop power control 54). On the basis of the SIR/target SIR comparison, the radio base station 28 provides power control commands as necessary to the user equipment unit 30 as a downlink aspect of the inner loop power control 56.

The outer loop power control 54 establishes the target SIR which is used as a basis for comparison by the inner loop power control 56. As indicated previously, the value of the target SIR may change due to various factors such as, e.g., increase and decrease of the number of mobile stations served by the base station.

One or more of the RNCs 26 is provided with an uplink synchronization promoter 60 which addresses the uplink synchronization issue discussed above and which may particularly occur during an uplink/downlink imbalance. In a non-limiting, example implementation, the uplink synchronization promoter 60 can be a functionality or subunit of RNC power control process unit 50, as illustrated in both FIG. 3 and FIG. 4.

In addition to RNC power control process unit 50, and as illustrated in FIG. 4, radio network controller (RNC) 26 comprises soft handover control logic or unit 62. The soft handover control unit 62 in turn comprises, or functions in conjunction with, an active set memory 64 which keeps record of an active set for a connection involving a user equipment unit 30.

The soft handover unit 62 controls a soft handover procedure wherein user equipment unit 30 has diversity in radio transmissions with plural radio base stations 28 comprising the active set of base stations having the composition stored in active set memory 64. A separate instance of soft handover control and active set memory may exist for each connection handled by radio network controller (RNC) 26 which is involved in soft handover, with the instances being handled by one or more soft handover control units 62 (although only one such soft handover control unit 62 is shown in FIG. 4).

The "active set" is the set of radio base stations (e.g., Node-Bs) to which the user equipment unit 30 is simultaneously connected (i.e., the UTRA cells currently assigning a downlink DPCH to the UE constitute the active set). See, e.g., 3 GPP 25.331, V6.5.0 (2005-03), 3 rd Generation Partnership Project; Technical Specification Group Radio Access Network; Radio Resource Control (RRC); Protocol Specification (Release 6), which is incorporated herein by reference. Cells, which are not included in the active set, but are included in a list known as the CELL_INFO_LIST, belong to the Monitored Set. Cells detected by the user equipment unit 30, which are neither in the CELL_INFO_LIST nor in the active set belong to the Detected Set.

The person skilled in the art will fully appreciate that radio network controller (RNC) 26 can and typically does include numerous functionalities other than those specifically shown in FIG. 4 and described herein, such as (for example) an extension terminal for connection to one or more radio base stations 28; an extension terminal for connection to a core network node; a timing unit; a main processor; a codec, various data services applications, etc., and possibly a switch for connecting various constituent units of radio network controller (RNC) 26. The functions of RNC power control process unit 50 and soft handover control unit 62 can be performed or realized by one or more suitably programmed digital microprocessors or general purpose computers, using an application specific integrated circuit (ASIC), and/or using one or more digital signal processors (DSPs).

The RNC power control process unit 50 supervises the outer loop power control 54 for a connection involved in soft handover. Accordingly, RNC power control process unit 50 comprises a functionality 66 which sets the uplink SIR_TARGET value, i.e., set uplink SIR_TARGET functionality 66. In addition, in an example embodiment, the uplink synchronization promoter 60 of RNC power control process unit 50 includes a soft handover power boost function 70.

The RBS power control process unit 52 participates both in the outer loop power control 54 and inner loop power control 56. As shown in FIG. 4, RBS power control process unit 52 includes a functionality 72 which serves to compare the uplink (UL) SIR for a connection to the SIR_TARGET as established and maintained by set uplink SIR_TARGET functionality 66. FIG. 4 further shows (by arrow 74) the compare UL SIR to SIR_TARGET functionality 72 receiving the SIR_TARGET value from set uplink SIR_TARGET functionality 66. In addition, RBS power control process unit 52 comprises a function or unit which adjust the UL power for a connection, i.e., adjust UL power function 76. As its name implies, the adjust UL power function 76 serves to adjust the UL power utilized by a user equipment unit 30 for a connection.

Other functionalities and units exist in radio base station 28 in addition to those shown in FIG. 4. For example, the person skilled in the art appreciates that radio base station 28 can comprise an extension terminal for landline connection to radio network controller (RNC) 26, transceivers (comprising, e.g., transmit boards and receive boards, amplifiers and filters, and antennae), one or more processors, and possibly a switch for connecting various constituent entities. The RBS power control process unit 52 can be implemented or realized by one or more suitably programmed digital microprocessors or general purpose computers, using an application specific integrated circuit (ASIC), and/or using one or more digital signal processors (DSPs).

The user equipment unit 30 has, among its other constituent entities, a transceiver 80 and a UE power control process unit 82. The UE power control process unit 82 includes, e.g., a UL power setting memory 84. As indicated by arrow 86, the UL power setting memory 84 receives (from adjust UL power function 76) a value to be used for the UL transmit power level by transceiver 80. The transceiver 80 accordingly sends signals to radio base station 28 (as indicated by arrow 88). The SIR of the uplink signals from transceiver 80 of user equipment unit 30 as received by radio base station 28 is compared by compare UL SIR to SIR_TARGET functionality 72 to the SIR_TARGET, with the result of the comparison being utilized by adjust UL power function 76 to adjust the power level used by transceiver 80 of user equipment unit 30, if necessary. The UE power control process unit 82 can be implemented or realized by one or more suitably programmed digital microprocessors or general purpose computers, using an application specific integrated circuit (ASIC), and/or using one or more digital signal processors (DSPs).

By virtue of uplink synchronization promoter 60, and specifically the soft handover power boost function 70, the RNC power control process unit 50, during the soft handover procedure, facilitates an adjustment of an uplink power level used by the user equipment unit 30 for uplink radio transmissions to the plural base stations 28 by an adjustment amount. The adjustment amount is determined to promote uplink synchronization for all radio base stations 28 of the active set. The soft handover power boost function 70 is invoked by soft handover control unit 62, and is invoked only during the soft handover procedure.

The adjustment amount is preferably a function of power levels of downlink reference signals of the active set, e.g., a function of a difference between power levels of downlink reference signals of the active set. For example, in one example implementation the adjustment amount can be a function of a difference between the power level of a strongest reference signal of the active set and the power level of a weakest reference signal of the active set. The downlink reference signals are signals which are measured and reported by the user equipment unit to the soft handover unit for use in determining when a soft handover procedure is to be invoked. For example, the downlink reference signals may be CPICH signals, and the power levels thereof may be the CPICH received signal code power (RSCP).

Figure 5:
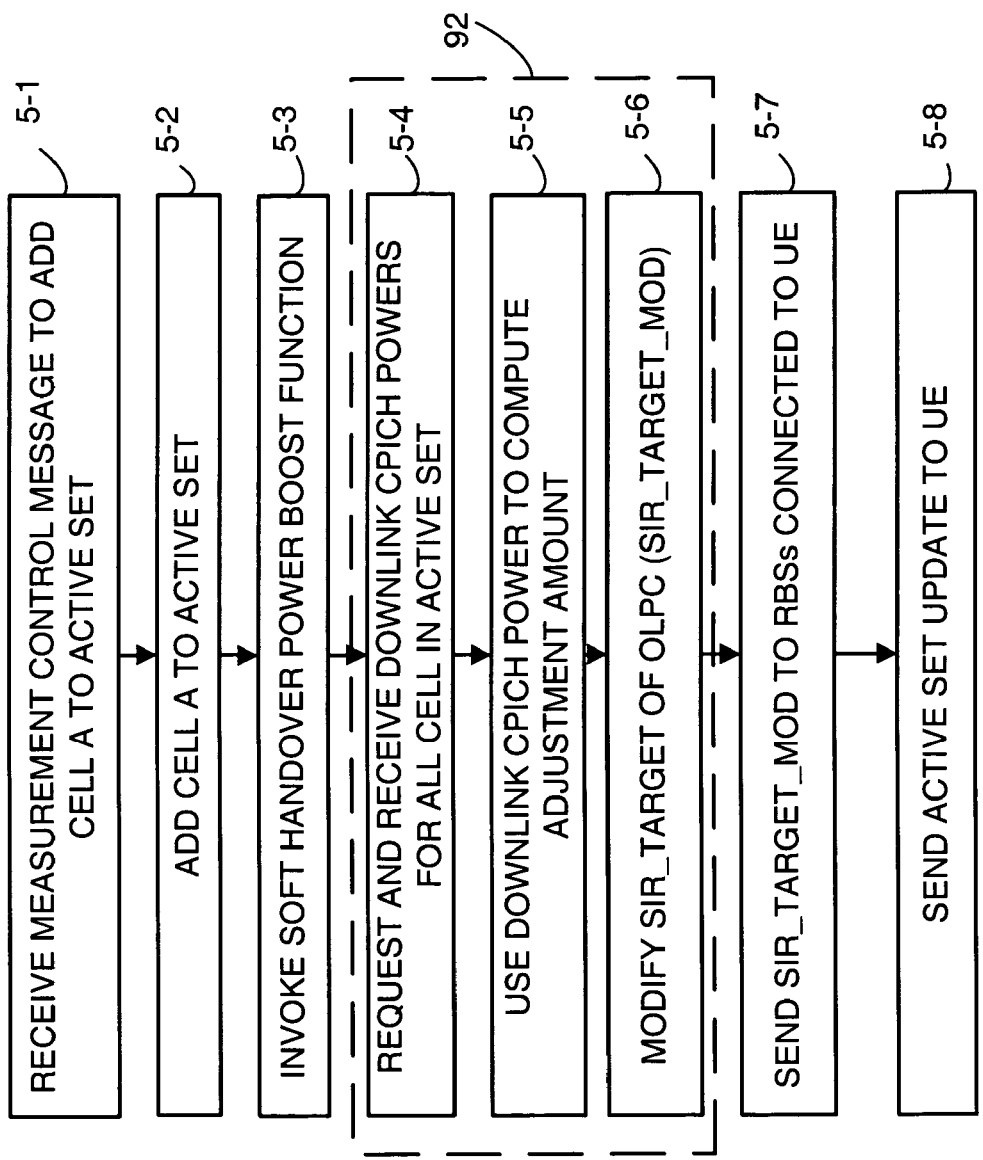
FIG. 5 is a flowchart showing basic, representative steps or actions performed by a radio network controller (RNC).
Figure 6:
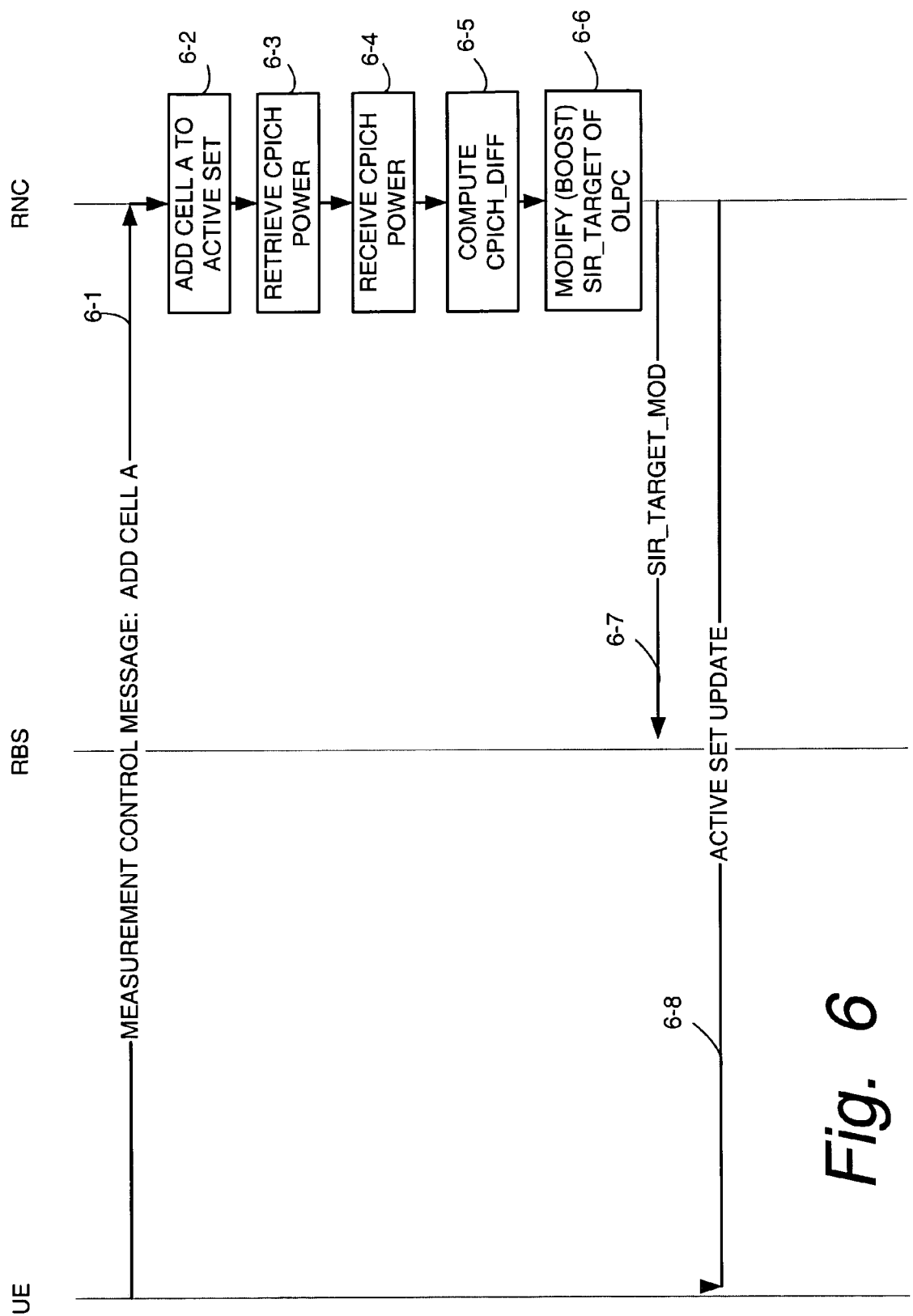
FIG. 6 is a diagrammatic view showing signaling between the radio network controller (RNC), radio base station, and user equipment unit of FIG. 4.

FIG. 5 shows basic, representative steps or actions performed by a radio network controller (RNC) 26 according to an example implementation. FIG. 6 shows, e.g., signaling between a radio network controller (RNC) 26, a radio base station 28, and a user equipment unit 30 (such as those shown in FIG. 4).

FIG. 5 shows, as action 5-1, soft handover control unit 62 of radio network controller (RNC) 26 receiving a message 6-1 which requests that a cell (i.e., cell "A") be added to the active set for a connection involved in soft handover. As an example, the type of message received as message 6-1 can be a measurement control message. Upon receipt of message 6-1, as action 5-2 in FIG. 5 (also shown as event 6-2 in FIG. 6) the soft handover control unit 62 adds cell A to the active set memory 64 for the connection involved in soft handover. Addition of cell A to the active set need not occur immediately in response to receipt of the measurement control message of 6-1, but reasonably thereafter. Addition of cell A to the active set involves soft handover control unit 62 storing suitable information regarding cell A in an appropriate record of active set memory 64 for the connection involved in the soft handover.

Action 5-3 of FIG. 5 reflects, by arrow 90, soft handover control unit 62 invoking soft handover power boost function 70 of uplink synchronization promoter 60. Basic, example, non-limiting, representative actions of FIG. 5 comprising soft handover power boost function 70 are framed by broken line 92 in FIG. 5.

Action 5-4 of FIG. 5 illustrates uplink synchronization promoter 60 requesting and receiving downlink CPICH powers for all cells in the active set for the connection involved in soft handover. Event 6-3 of FIG. 3 shows the uplink synchronization promoter 60 requesting the downlink CPICH power for a particular radio base station. Event 6-4 shows the uplink synchronization promoter 60 obtaining the downlink CPICH for the particular radio base station 28. Typically the downlink CPICH power is already known and thus obtained at the RNC making the request. Such is not necessarily always the case, as it may be another RNC that is responsible for the RBS whose downlink CPICH power is sought and which is consulted, or alternatively some support/operations/management node. In some cases the RNC may contact the RBS directly to obtain the CPICH power. The CPICH power is generally configured by the controlling RNC (managing the particular RBS) and thereafter it remains constant and known. Yet there are other ways in which the CPICH power level can become known by the RNC, such as (for example) the CPICH power level being signaled to the RNC from the RBS; the CPICH power level being signaled to the RNC from a different RNC (which can occur, for example, when one of the RBSs in the active set is controlled by another RNC); and, the CPICH power level being signaled to the RNC from a management node.

As part of action 5-4, the uplink synchronization promoter 60 of radio network controller (RNC) 26 obtains the CPICH powers relative the antenna connector (as stored at an appropriate node) for all cells in active set (including newly added cell A). As understood by those skilled in the art, the antenna connector is situated at a point just before the antenna, but after the feeder cable from the RBS power amplifier.

As action 5-5, uplink synchronization promoter 60 uses the downlink CPICH powers obtained at action 5-4 to compute an adjustment amount. Corresponding event 6-5 shows a particular example implementation wherein the adjustment amount is set as a function of a difference between the power level of a strongest reference signal of the active set and a power level of the weakest reference signal of the active set, i.e., a function of a difference CPICH_Diff, or f(CPICH_Diff). In one such implementation, the computation of the adjustment amount, and thus the function, is directly related to a difference CPICH_Diff between a strongest of the CPICH values obtained at action 5-4 and a weakest of the CPICH values obtained at action 5-4. In other words, a difference is found between the strongest and weakest CPICH values of the active set involved in the soft handover. Typically the adjustment amount, e.g., difference CPICH_Diff, is expressed in decibels (dB).

In another example implementation, the adjustment amount can take into consideration an additional factor or offset which reflects the priority or urgency of achieving the desired result of obtaining uplink synchronization. For example, the adjustment amount can be computed as f(CPICH_Diff)+Offset, where Offset is a value indicative or reflective of the priority or urgency of achieving the uplink synchronization.

As reflected by action 5-6 and event 6-6, the soft handover power boost function 70 modifies the uplink SIR_TARGET of outer loop power control 54. For example, the soft handover power boost function 70 may use the adjustment amount to modify the SIR_TARGET. The soft handover power boost function 70 thus directs set uplink SIR_TARGET functionality 66 how to set the uplink SIR_TARGET. For example, the soft handover power boost function 70 may generate a modified SIR_TARGET value (e.g., SIR_TARGET_mod) according to Expression 1, or (more generally) according to Expression 2.

$$\text{SIR\_TARGET\_mod} = \text{old SIR\_TARGET} + CPICH\_Diff \quad \text{Expression 1}$$

$$\text{SIR\_TARGET\_mod} = \text{old SIR\_TARGET} + f(CPICH\_Diff) \quad \text{Expression 2}$$

Figure 7:
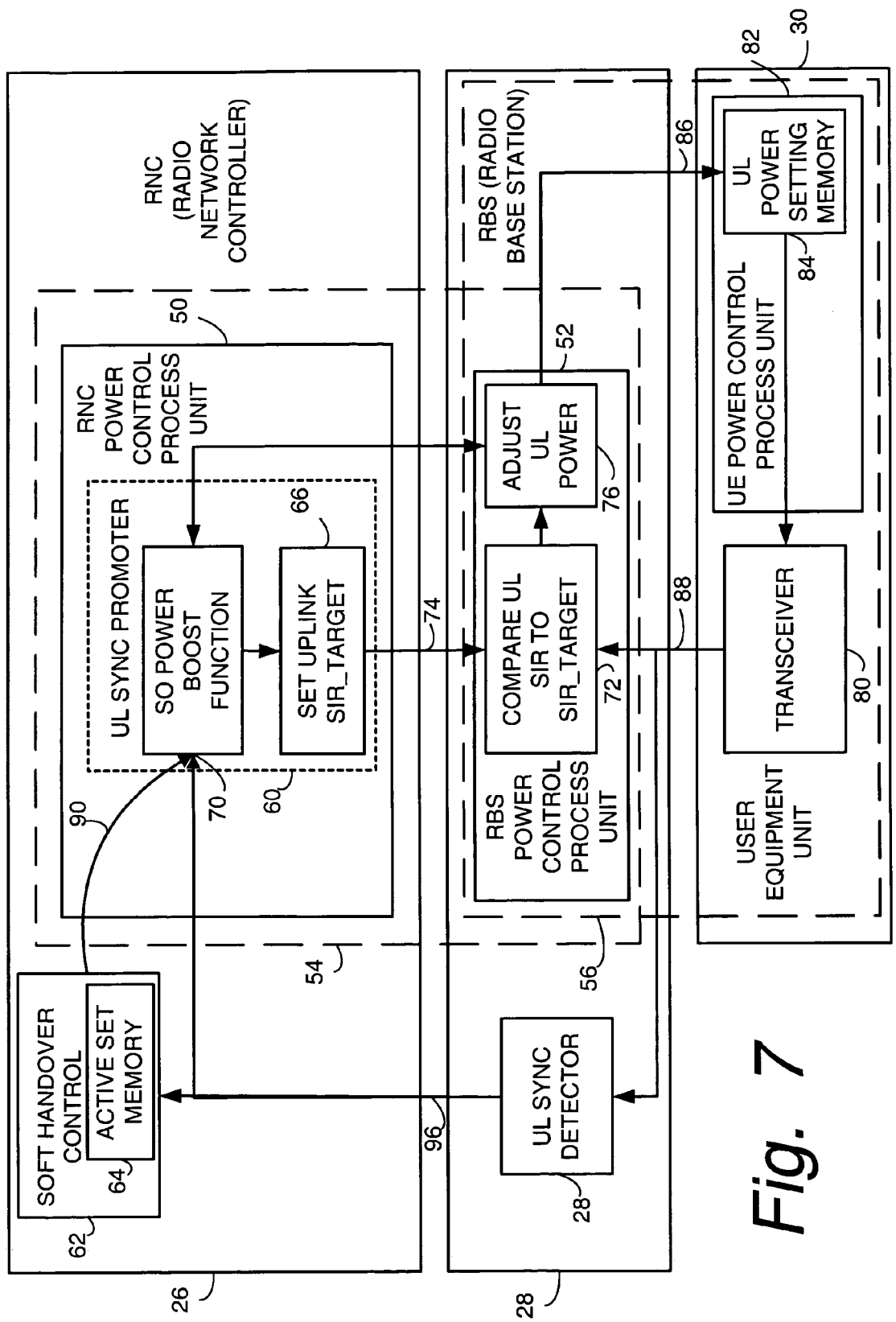
FIG. 7 is a schematic view of selected constituent units of an example radio network controller (RNC), an example radio base station, and an example user equipment unit, according to a second example embodiment.

As action 5-7 of FIG. 5 and as signal 6-7 of FIG. 7, and as also depicted by arrow 74 in FIG. 4, the set uplink SIR_TARGET functionality 66 sends the modified SIR_TARGET (e.g., SIR_TARGET_mod) to RBS power control process unit 52 of radio base station 28. The modified SIR_TARGET is then utilized for the inner loop power control 56, including for the comparision with the UL SIR performed by compare UL SIR to SIR_TARGET functionality 72. As needed, the UL power for the legs of the connection involved in the soft handover is adjusted by adjust UL power function 76. This means that user equipment unit 30 will aim at a higher SIR target than necessary during the soft handover and thereby will manage to connect to all cells including the weakest cell. Such adjustment, e.g., increased UL power, affords greater opportunity for uplink synchronization from the user equipment unit for all cells in the active set.

Action 5-8 and event 6-8 show an active set update wherein soft handover control unit 62 sends information (from, e.g., active set memory 64) to user equipment unit 30 to enable the user equipment unit 30 to update its accounting of the active set. At this point in time, the active set as maintained by user equipment unit 30 with now also include cell "A" which was the subject of the measurement control message 6-1 (received as action 5-1).

Thus, in accordance with one example implementation, one way in which the RNC power control process unit 50 facilitates the adjustment of an uplink power level is by at least ultimately controlling a maximum uplink power level used by the user equipment unit 30 for uplink radio transmissions to the plural base stations. As just exemplified, the RNC power control process unit 50 can control the maximum uplink power level by modifying a target signal to interference ratio (SIR) of an outer loop power control scheme.

The soft handover power boost function 70 is invoked to modify or boost the SIR target when more than one cell is in the active set. In one example implementation, the soft handover power boost function 70 is initiated by the soft handover procedure and is terminated at the end of the soft handover procedure. In this implementation, the soft handover power boost function 70 is thus invoked for a connection essentially throughout duration of the soft handover procedure. That is, the soft handover power boost function is initiated by the soft handover procedure and is terminated at the end of the soft handover procedure.

Figure 8:
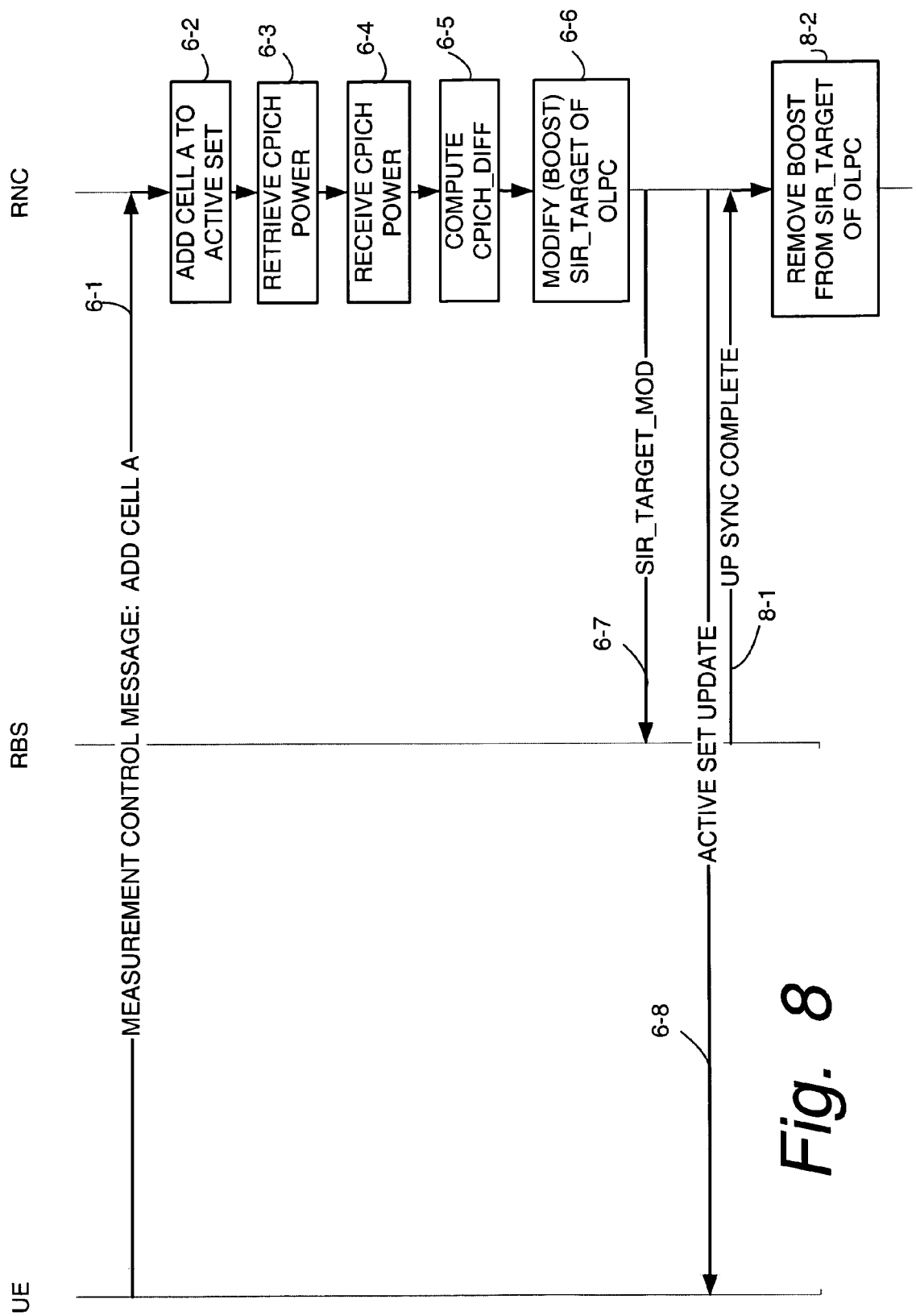
FIG. 8 is a diagrammatic view showing signaling between the radio network controller (RNC), radio base station, and user equipment unit of FIG. 7.

FIG. 7 and FIG. 8 illustrate an alternative example embodiment wherein elements and events identical or similar to those of FIG. 4 and FIG. 6, respectively, are depicted with same reference numerals. FIG. 7 and FIG. 8 illustrate how the embodiment of FIG. 4 and FIG. 6 can be modified or augmented so that the soft handover power boost function is terminated in dependence upon receipt of notification of completion of uplink synchronization for a new radio base station added to the active set. To this end, FIG. 7 shows radio base station 28 as comprising an uplink synchronization detector 94. When uplink synchronization detector 94 has confirmed that uplink synchronization at a new cell is completed (i.e., a cell such as cell A most recently added to the active set), an uplink synchronization complete signal is sent to one or both of soft handover control unit 62 and soft handover power boost function 70, as indicated by arrow 96 in FIG. 7 and event 8-1 in FIG. 8. A non-limiting example of an uplink synchronization complete signal 8-1 is a NBAP Uplink Synch Complete message. In other systems, a comparable or like message may be differently entitled and differently structured or formatted.

FIG. 7 happens to show the uplink synchronization complete signal 8-1 as being sent both to soft handover control unit 62 and 70. It will be appreciated, however, that the uplink synchronization complete signal 8-1 can instead be sent initially only to soft handover control unit 62, and that upon receipt of the uplink synchronization complete signal 8-1 the soft handover control unit 62 can subsequently (and as a separate message or signal) inform soft handover power boost function 70 of the completion of uplink synchronization. In the example embodiment of FIG. 7 and FIG. 8, the power boost or modification provided by soft handover power boost function 70 can be removed in timed relation upon receipt of the uplink synchronization complete signal 8-1 (e.g., either immediately upon receipt or at a specified time thereafter). Event 8-2 of FIG. 8 shows the removal of the power boost for the outer loop SIR_TARGET, e.g., the power modification or boost provided by event 6-6 is cancelled or otherwise counteracted.

The removal of the power boost can return the SIR_TARGET to a pre-boost power level (e.g., a SIR_TARGET power level precedig event 6-6). Alternatively, if the SIR_TARGET has been modified or influenced by other factors during the soft handover procedure since the power boost margin was added at event 6-6, the power boost itself can be removed to leave a post-boost base SIR_TARGET value that may be different from the pre-boost base SIR_TARGET value.

It may happen that two cells (e.g., cell C and cell D) are added essentially at the same time to the active set, and that cell C obtains uplink synchronization before cell D. In such case, one option is to wait for uplink synchronization for all new cells before removing the power boost. Alternatively, as another option, if the uplink synchronization is achieved for cell C, the power boost for cell C may be removed while the power boost remains for cell D until cell D has also achieved uplink synchronization.

Figure 9:
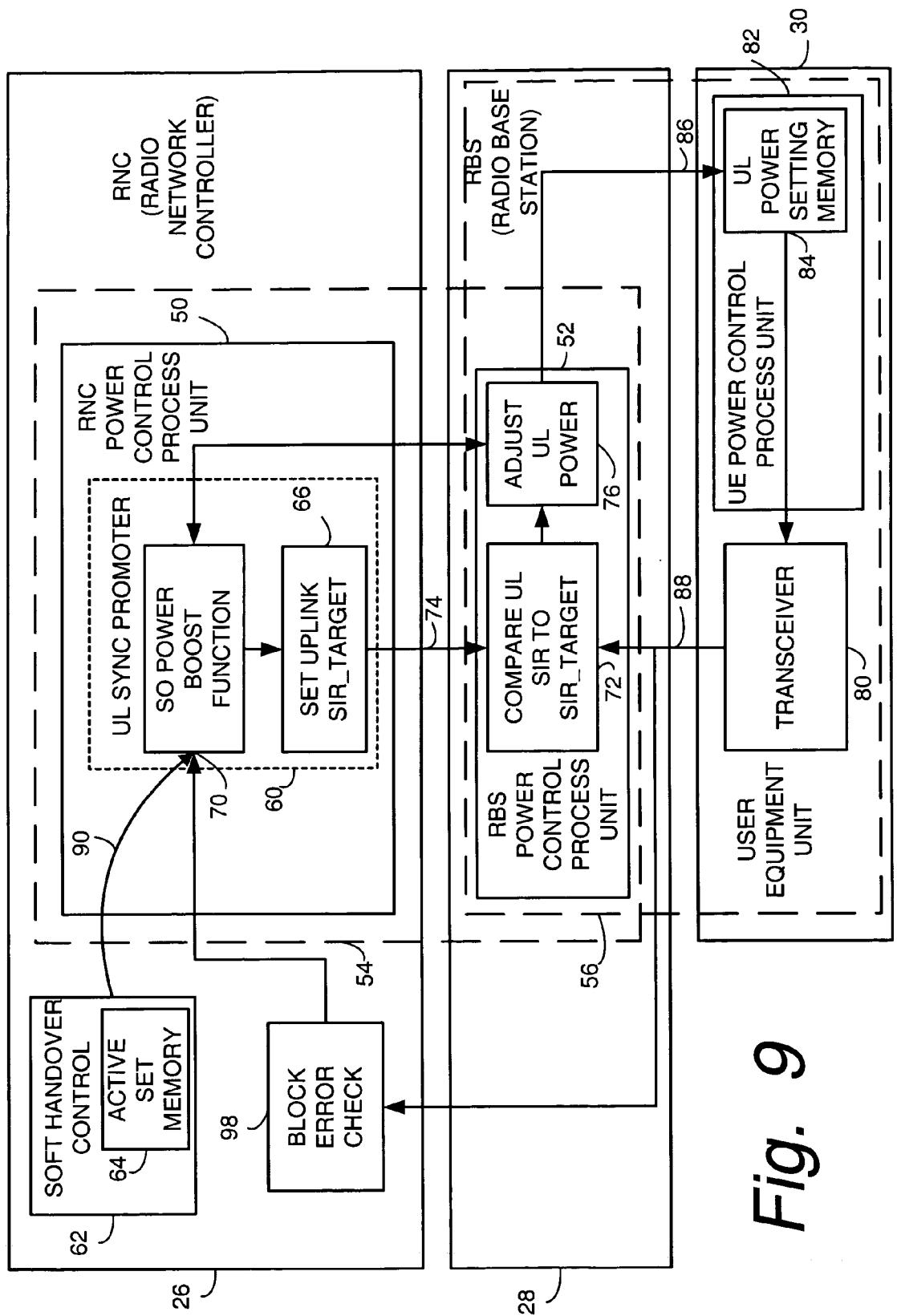
FIG. 9 is a schematic view of selected constituent units of an example radio network controller (RNC), an example radio base station, and an example user equipment unit, according to a third example embodiment.
Figure 10:
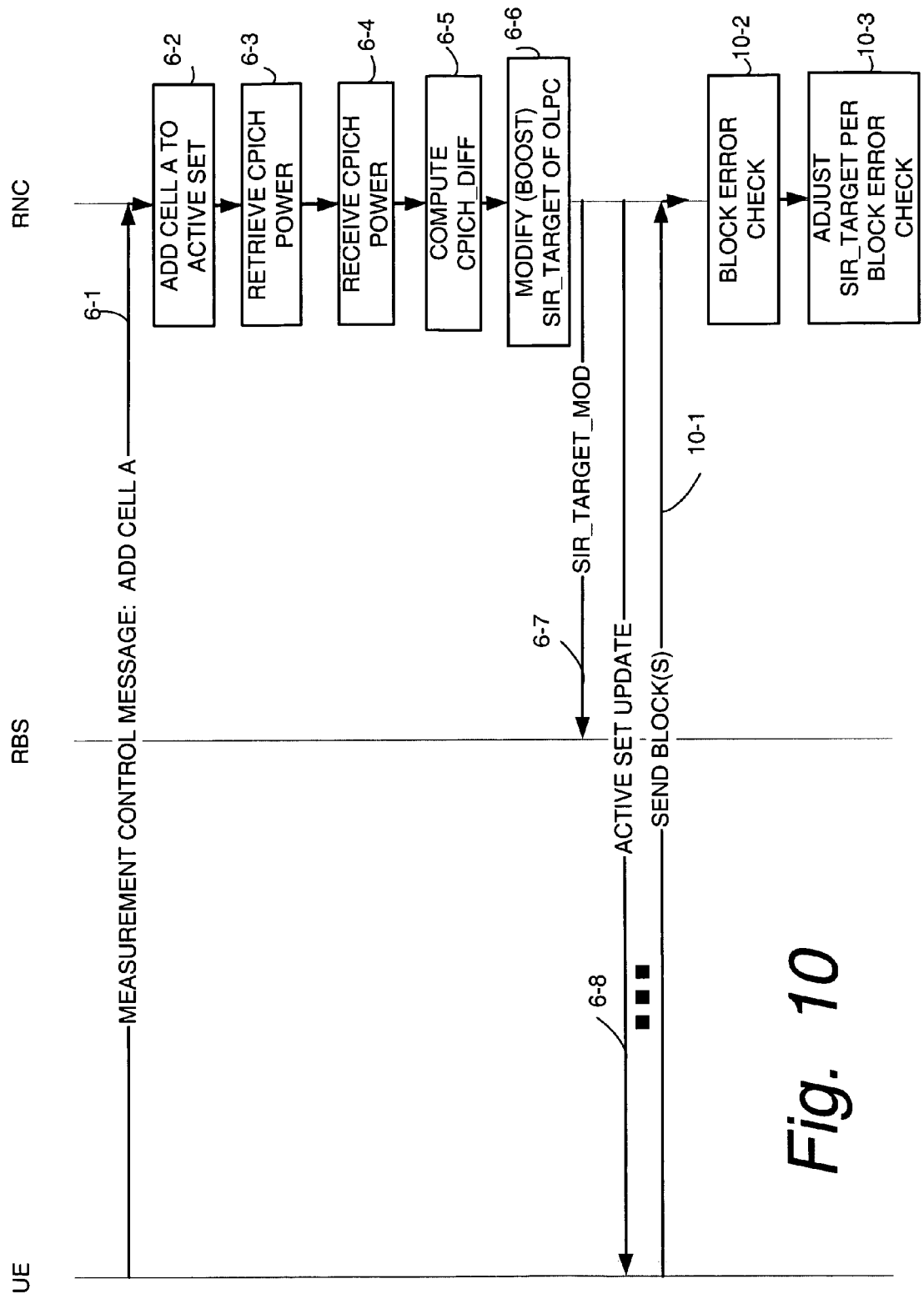
FIG. 10 is a diagrammatic view showing signaling between the radio network controller (RNC), radio base station, and user equipment unit of FIG. 9.

In another separate and distinct aspect of the technology and embodiment, illustrated in FIG. 9-FIG. 11, the power control unit further can optionally further adjust the uplink power level during the soft handover procedure in dependence upon whether all transport blocks received via the active set are erroneously received or whether all transport blocks received via the active set are accurately received. In FIG. 9-FIG. 11, elements and events identical or similar to those of FIG. 4-FIG. 7, respectively, are depicted with same reference numerals.

FIG. 10 shows by event 10-1 that blocks of information (e.g., blocks of information known as transport blocks) are transmitted on the uplink from user equipment unit 30 via radio base station 28 to radio network controller (RNC) 26.

In the time sequence shown in FIG. 10, the blocks are transmitted after the active set update of event 6-8, and thus the transport blocks are sent via plural cells from user equipment unit 30 to radio network controller (RNC) 26. FIG. 9 shows radio network controller (RNC) 26 as further comprising a block error check unit or functionality 98 which checks the integrity or accuracy of the blocks received, and which can optionally also determine a block error rate for transport blocks so transmitted.

The transport block can reach the RNC in either of two different ways when the active set has more than one RBS, and depending on whether the cells are at the same of different sites. When the cells are at different RBS sites, the data is decoded at each RBS together with the CRC to check if the data was correctly decoded and then sent through two different paths to the RNC. If one of the transport blocks was erroneous, then the other one is used, and only if both are corrupt, a negative acknowledgment (NACK) is sent over radio link control to resend the block. When the cells are at the same site, the soft data (before decoding) is combined to optimally decode the data considering both received signals, and the result is sent to the RNC. The correctness of the transport block is thus evaluated at the RBS, but checked in the RNC upon reception of data from all RBSs in the active set (as indicated by event 10-2).

Thus, event 10-2 illustrates the block error check unit 98 performing the block error check for the blocks received on the uplink from user equipment unit 30 during the soft handover procedure. The logic illustrated in FIG. 11 shows further example steps involved in a routine (performed, at least in part, by, e.g., block error check unit 98) for adjusting uplink power level during the soft handover procedure in dependence upon block error or block error rate. FIG. 11 specifically shows (as step 11-1) radio network controller (RNC) 26 receiving transport blocks from all cells in the active set and (as step 11-2) performing a block error check with respect to each block. At step 1-3 a check is made whether all received blocks are erroneous. If all received blocks are erroneous, as step 11-4 a signal or indication is sent to RNC power control process unit 50 to increase the SIR_TARGET. At step 1-5 a check is made whether all received blocks are correct. If all received blocks are correct, as step 11-6 a signal or indication is sent to RNC power control process unit 50 to decrease the SIR_TARGET. Processing of the received blocks continues in essentially loop fashion until it is determined (ate step 11-7) that transmission is complete and the dynamic adjustment of the SIR_TARGET can be terminated (step 11-8).

Thus, the example alternative embodiment of FIG. 9-FIG. 11 provides an additional and optional mechanism to change the outer loop power control behavior (using the current jump or boost algorithm) during soft handover to only update the SIR_TARGET when all links points in the same direction (e.g., to increase SIR_TARGET only when blocks from all links are erroneous, and to decrease SIR_TARGET only when blocks from all links are correct). This means that SIR_TARGETs remain at the needed level to support uplink synchronization on all uplinks in the active set.

If capability provided by the embodiment of FIG. 9-FIG. 11 overcomes a tendency which otherwise might occur when invoking soft handover power boost function 70 in a conventional context. That is, when the soft handover power boost function 70 increases SIR_TARGET when entering soft handover to ensure uplink synch to the cell with the lowest CPICH power, the logic of FIG. 9-FIG. 11 precludes the possibility that the outer loop power control 54 would slowly, but surely, decrease the SIR_TARGET merely because at least one block is received correctly. Such lowering or decrease of SIR_TARGET on the basis of correct receipt of only one (but not all) blocks during the soft handover could prematurely jeopardize uplink synch to the cell with the lowest CPICH power.

As seen from the foregoing, the power control unit, during the soft handover procedure, modifies a parameter of an outer loop power control scheme to facilitate an adjustment of an uplink power level used by the user equipment unit for uplink radio transmissions to the plural base stations, and thereby promotes uplink synchronization for all radio base stations of the active set. For example, the parameter of an outer loop power control scheme so modified can be the target signal to interference ratio (SIR) of the outer loop power control scheme. The modified parameter could be another parameter, such as CPICH RSCP, or another parameter that is a function of the SIR or statistically related to SIR, such as (for example) variance.

The present technology thus, at least in part, conceptualizes soft handover as a robustness mechanism rather than a mechanism with a capacity gain. Advantageously, RNC power control process unit 50 with its soft handover power boost function 70 or comparable unit adjusts the outer loop power controlled SIR_TARGET using information about relative CPICH powers between cells in the active set. The adjustment can be always active when in soft handover, or (alternatively) deactivated when the RNC receives a confirmation of successful uplink synchronization at the recently added cell to the active set.

Restrictions on the uplink-downlink imbalance may limit the possible CPICH power levels that can be used in practice. This means that load balancing by adjusting CPICH powers can be intractable, since the desired and required CPICH power levels are beyond reach. With the proposed modifications, it is possible to operate the network with larger uplink-downlink imbalance without jeopardizing the uplink synchronization at active set updates.

It should be understood that the functionalities herein described need not be provided in a dedicated unit or as herein illustrated, but can be combined with other functionalities and situated and/or distributed in manners other than those herein illustrated.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A control node of a radio access network comprising:
a soft handover unit configured to control a soft handover procedure wherein a user equipment unit has diversity in radio transmissions with plural radio base stations comprising an active set of base stations;
a power control unit configured to facilitate, during the soft handover procedure, an adjustment of an uplink power level used by the user equipment unit for uplink radio transmissions to the plural base stations by an adjustment amount, the adjustment amount being a function of downlink reference signals of the active set and being determined to promote uplink synchronization for radio base stations of the active set.

2. The apparatus of claim 1, wherein the power control unit comprises a soft handover power boost function configured to increase during the soft handover procedure the uplink power level used by the user equipment unit for uplink radio transmissions by the adjustment amount, and wherein the adjustment amount is a function of a difference between the downlink reference signals of the active set.

3. The apparatus of claim 2, wherein the adjustment amount is a function of a difference between a strongest reference signal of the active set and a weakest reference signal of the active set.

4. The apparatus of claim 1, wherein the power control unit comprises a soft handover power boost function configured to increase during the soft handover procedure the uplink power level used by the user equipment unit for uplink radio transmissions by the adjustment amount, and wherein the adjustment amount is a function of power of the downlink reference signals of the active set.

5. The apparatus of claim 4, wherein the power boost function is invoked only during the soft handover procedure.

6. The apparatus of claim 4, wherein the reference signals are signals which are measured and reported by the user equipment unit to the soft handover unit for use in determining when a soft handover procedure is to be invoked.

7. The apparatus of claim 1, wherein the power control unit is configured at least ultimately to control a maximum uplink power level used by the user equipment unit for uplink radio transmissions to the plural base stations.

8. The apparatus of claim 7, wherein the power control unit is configured to control the maximum up link power level by modifying a target signal to interference ratio.

9. The apparatus of claim 1, wherein the power control unit further is configured to adjust the uplink power level during the soft handover procedure in dependence upon whether all transport blocks received via the active set are erroneously received or whether all transport blocks received via the active set are accurately received.

10. The apparatus of claim 1, wherein the adjustment amount takes into consideration an additional factor which reflects priority or urgency of achieving uplink synchronization.

11. A control node of a radio access network comprising:
soft handover unit which controls a soft handover procedure wherein a user equipment unit has diversity in radio transmissions with plural radio base stations comprising an active set of base stations;
a power control unit which, during the soft handover procedure, facilitates an adjustment of an uplink power level used by the user equipment unit for uplink radio transmissions to the plural base stations by an adjustment amount, the adjustment amount being determined to promote uplink synchronization for the radio base stations of the active set;
wherein the power control unit comprises a soft handover power boost function which is initiated by the soft handover procedure, and wherein the soft handover power boost function is terminated in dependence upon receipt of notification of completion of uplink synchronization for a new radio base station added to the active set.

12. A control node of a radio access network comprising:
a soft handover unit configured to control a soft handover procedure wherein a user equipment unit has diversity in radio transmissions with plural radio base stations comprising an active set of base stations;

a power control unit configured to modify, during the soft handover procedure, a parameter of an outer loop power control scheme to facilitate an adjustment of an uplink power level used by the user equipment unit for uplink radio transmissions to the plural base stations and thereby promote uplink synchronization for radio base stations of the active set, the adjustment being a function of downlink reference signals of the active set.

13. The apparatus of claim 12, wherein the power control unit comprises a soft handover power boost function configured to increase, during the soft handover procedure, the uplink power level used by the user equipment unit for uplink radio transmissions by an adjustment amount, and wherein the adjustment amount is a function of a difference between the downlink reference signals of the active set.

14. The apparatus of claim 12, wherein the adjustment amount is a function of a difference between a strongest reference signal of the active set and a weakest reference signal of the active set.

15. The apparatus of claim 12, wherein the power control unit comprises a soft handover power boost function configured to increase during the soft handover procedure the uplink power level used by the user equipment unit for uplink radio transmissions by an adjustment amount, and wherein the adjustment amount is a function of power levels of the downlink reference signals of the active set.

16. The apparatus of claim 15, wherein the reference signals are signals which are measured and reported by the user equipment unit to the soft handover unit for use in determining when a soft handover procedure is to be invoked.

17. The apparatus of claim 12, wherein the power control unit is configured at least ultimately to control a maximum uplink power level used by the user equipment unit for uplink radio transmissions to the plural base stations.

18. The apparatus of claim 17, wherein the power control unit is configured to control the maximum uptint power level by modifying a target signal to interference ratio.

19. The apparatus of claim 12, wherein the power control unit is further configured to adjust the uplink power level during the soft handover procedure in dependence upon whether all transport blocks received via the active set are erroneously received or whether all transport blocks received via the active set are accurately received.

20. The apparatus of claim 12, wherein the parameter is modified by a factor which reflects priority or urgency of achieving uplink synchronization.

21. A control node of a radio access network comprising:
a soft handover unit which controls a soft handover procedure wherein a user equipment unit has diversity in radio transmissions with plural radio base stations comprising an active set of base stations;
a power control unit which, during the soft handover procedure, modifies a parameter of an outer loop power control scheme to facilitate an adjustment of a uplink power level used by the user equipment unit for uplink radio transmissions to the plural base stations and thereby promote uplink synchronization for the radio base stations of the active set;
wherein the power control unit comprises a soft handover power boost function which is initiated by the soft handover procedure, and wherein the soft handover power boost function is terminated in dependence upon receipt of notification of completion of uplink synchronization for a new radio base station added to the active set.

22. A method of operating a control node of a radio access network comprising:
initiating a soft handover procedure wherein a user equipment unit has diversity in radio transmissions with plural radio base stations comprising an active set of base stations;
during the soft handover procedure, facilitating an adjustment of an uplink power level used by the user equipment unit for uplink radio transmissions to the plural base stations by an adjustment amount, the adjustment amount being a function of downlink reference signals of the active set and being determined to promote uplink synchronization for radio base stations of the active set.

23. The method of claim 22, during the soft handover procedure increasing the uplink power level used by the user equipment unit for uplink radio transmissions by the adjustment amount, wherein the adjustment amount is a function of a difference between the downlink reference signals of the active set.

24. The method of claim 22, setting the adjustment amount as a function of a difference between a strongest reference signal of the active set and a weakest reference signal of the active set.

25. The method of claim 22, during the soft handover procedure increasing the uplink power level used by the user equipment unit for uplink radio transmissions by the adjustment amount, wherein the adjustment amount is a function of power levels of the downlink reference signals of the active set.

26. The method of claim 22, wherein the power control unit controls a maximum uplink power level by modifying a target signal to interference ratio.

27. The method of claim 22, further comprising adjusting the uplink power level during the soft handover procedure in dependence upon whether all transport blocks received via the active set are erroneously received or whether all transport blocks received via the active set are accurately received.

28. The method of claim 22, further comprising determining the adjustment amount to take into consideration a factor which reflects priority or urgency of achieving uplink synchronization.

29. A method of operating a control node of a radio access network comprising:
initiating a soft handover procedure wherin a user equipment unit has diversity in radio transmissions with plural radio base stataions comprising an active set of base stations;
during the soft handover procedure, facilitating an adjustment of an uplink power level used by the user equipment unit for uplink radio transmissions to the plural base stations aby an adjustment amount, the adjustment amount being determined to promote uplink synchronization for the radio base stations of the active set;
using a soft handover power boost function to facilitate the adjustment of the uplink power level during the soft handover procedure;
the soft handover procedure initiating the soft handover power boost function;
terminating the soft handover power boost function in dependence upon receipt of notification of completion of uplink synchronization for a new radio base station added to the active set.

30. A method of operating a control node of a radio access network comprising:
   initiating a soft handover procedure wherein a user equipment unit has diversity in radio transmissions with plural radio base stations comprising an active set of base stations;
   during the soft handover procedure, modifying a parameter of an outer loop power control scheme to facilitate an adjustment of an uplink power level used by the user equipment unit for uplink radio transmissions to the plural base stations and thereby promote uplink synchronization for radio base stations of the active set, the adjustment being a function of downlink reference signals of the active set.

31. The method of claim 30, further comprising, during the soft handover procedure, increasing the uplink power level used by the user equipment unit for uplink radio transmissions by an adjustment amount, wherein the adjustment amount being a function of a difference between the downlink reference signals of the active set.

32. The method of claim 31, wherein the adjustment amount is a function of a difference between a strongest reference signal of the active set and a weakest reference signal of the active set.

33. The method of claim 30, further comprising adjusting a maximum uplink power level by modifying a target signal to interference ratio.

34. The method of claim 30, further comprising adjusting the uplink power level during the soft handover procedure in dependence upon whether all transport blocks received via the active set are erroneously received or whether all transport blocks received via the active set are accurately received.

35. The method of claim 30, further comprising modifying the parameter to take into consideration a factor which reflects priority or urgency of achieving up link synchronization.

36. A method of operating a control node of a radio access network comprising;
   initiating a soft handover procedure wherein a user equipment unit has diversity in radio transmissions with plural radio base stations comprising an active set of base stations;
   during the soft handover procedure, modifying a parameter of an outer loop power control scheme to facilitate an adjustment of an uplink power level used by the user equipment unit for uplink radio transmissions to the plural base stations and thereby promote uplink synchronization for teh radio base stations of the active set;
   using a soft handover power boost function to facilitate the adjustment of the uplink power level during the soft handover procedure;
   the soft handover procedure initiating the soft handover power boost function;
   terminating the soft handover power boost function in dependence upon receipt of notification of completion of uplink synchronization for a new radio base station added to the active set.

* * * * *

UNITED STATES PATENT AND TRADEMARK OFFICE
CERTIFICATE OF CORRECTION

| | |
|---|---|
| PATENT NO. | : 7,269,422 B2 |
| APPLICATION NO. | : 11/176686 |
| DATED | : September 11, 2007 |
| INVENTOR(S) | : Gunnarsson et al. |

It is certified that error appears in the above-identified patent and that said Letters Patent is hereby corrected as shown below:

On the Title Page, in the Figure, for Tag "70", in Line 1, delete "SO" and insert -- SHO --, therefor.

On Title Page 2, Item (56), under "OTHER PUBLICATIONS", in Column 2, Line 3, delete "$52^{nd}$ Sep." and insert -- $52^{nd}$, Sep. --, therefor.

In the Drawings

Figures 1A, 1B:
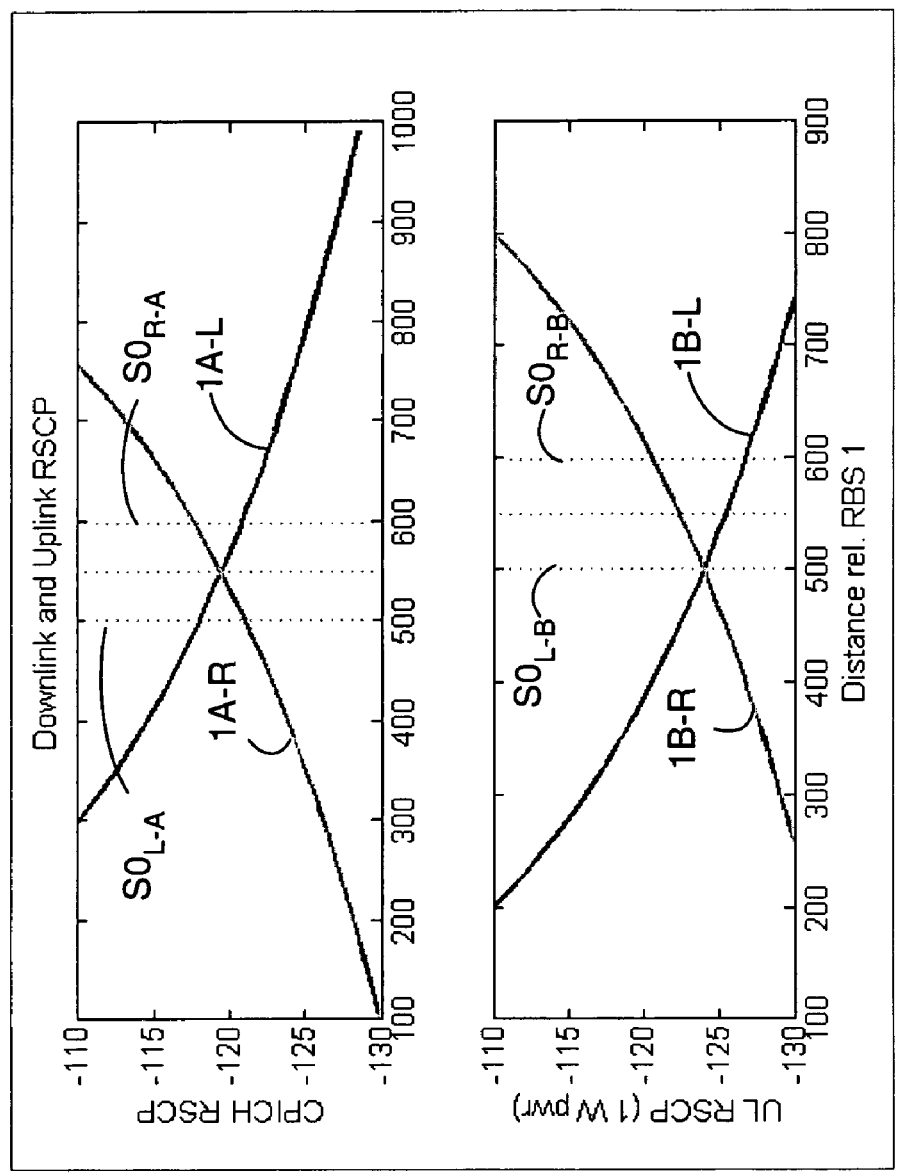
FIG. 1A and FIG. 1B are graphs showing CPICH RSCP and uplink (UL) RSCP, respectively, for two example base stations of a first example scenario.
Figures 2A, 2B:
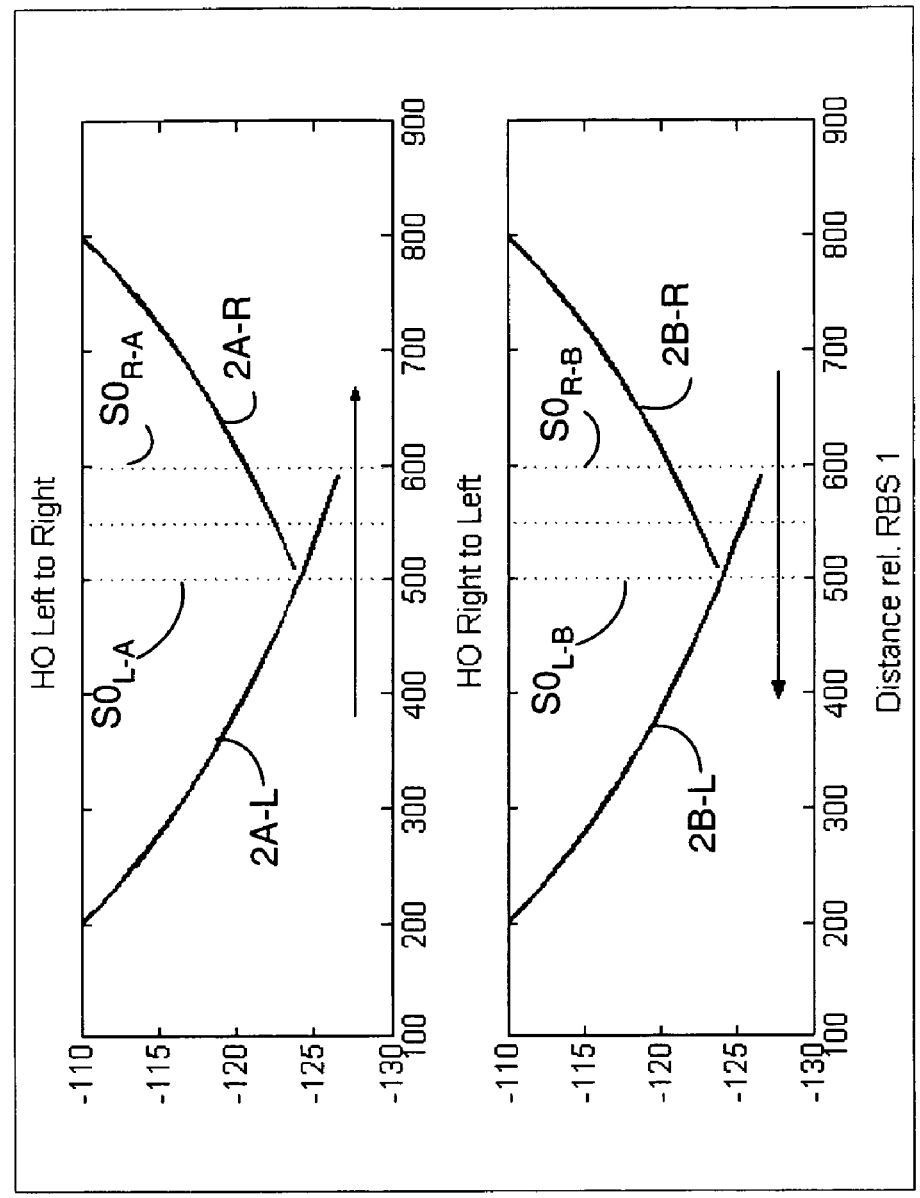
FIG. 2A and FIG. 2B are graphs showing CPICH RSCP and uplink (UL) RSCP, respectively, for two example base stations of a second example scenario.

In Fig. 1A, Sheet 1 of 11, delete "$SO_{L-A}$" and insert -- $SHO_{L-A}$ --, therefor at each occurrence throughout the patent.

In Fig. 1A, Sheet 1 of 11, delete "$SO_{R-A}$" and insert -- $SHO_{R-A}$ --, therefor at each occurrence throughout the patent.

In Fig. 1B, Sheet 1 of 11, delete "$SO_{L-B}$" and insert -- $SHO_{L-B}$ --, therefor at each occurrence throughout the patent.

In Fig. 1B, Sheet 1 of 11, delete "$SO_{R-B}$" and insert -- $SHO_{R-B}$ --, therefor at each occurrence throughout the patent.

In Fig. 4, Sheet 4 of 11, for Tag "70", in Line 1, delete "SO" and insert -- SHO --, therefor.

In Fig. 7, Sheet 7 of 11, for Tag "70", in Line 1, delete "SO" and insert -- SHO --, therefor.

In Fig. 9, Sheet 9 of 11, for Tag "70", in Line 1, delete "SO" and insert -- SHO --, therefor.

Signed and Sealed this
Twenty-second Day of April, 2014

Michelle K. Lee
*Deputy Director of the United States Patent and Trademark Office*

In the Specification

In Column 2, Line 64, delete "3 GPP" and insert -- 3GPP --, therefor.

In Column 7, Line 35, delete "RNC26$_2$." and insert -- RNC 26$_2$. --, therefor.

In Column 7, Line 45, delete "URAN" and insert -- UTRAN --, therefor.

In Column 9, Line 8, delete "3 GPP" and insert -- 3GPP --, therefor.

In Column 9, Line 8, delete "3 rd" and insert -- 3rd --, therefor.

In Column 12, Line 24, delete "comparision" and insert -- comparison --, therefor.

In Column 13, Line 38, delete "precedig" and insert -- preceding --, therefor.

In the Claims

In Column 16, Line 5, in Claim 2, delete "procedure" and insert -- procedure, --, therefor.

In Column 16, Line 16, in Claim 4, delete "procedure" and insert -- procedure, --, therefor.

In Column 16, Line 32, in Claim 8, delete "up link" and insert -- uplink --, therefor.

In Column 16, Line 45, in Claim 11, delete "soft handover unit" and insert -- a soft handover unit --, therefor.

In Column 17, Line 22, in Claim 15, delete "procedure" and insert -- procedure, --, therefor.

In Column 17, Line 37, in Claim 18, delete "uptint" and insert -- uplink --, therefor.

In Column 17, Line 56, in Claim 21, delete "a uplink" and insert -- an uplink --, therefor.

In Column 18, Line 48, in Claim 29, delete "wherin" and insert -- wherein --, therefor.

In Column 18, Line 50, in Claim 29, delete "stataions" and insert -- stations --, therefor.

In Column 18, Line 55, in Claim 29, delete "aby" and insert -- by --, therefor.

In Column 20, Line 6, in Claim 35, delete "up link" and insert -- uplink --, therefor.

In Column 20, Line 19, in Claim 36, delete "teh" and insert -- the --, therefor.